A. L. EUSTICE.
MEANS FOR ESTABLISHING ELECTRICAL CONNECTIONS.
APPLICATION FILED JULY 20, 1917.
1,350,444.
Patented Aug. 24, 1920.
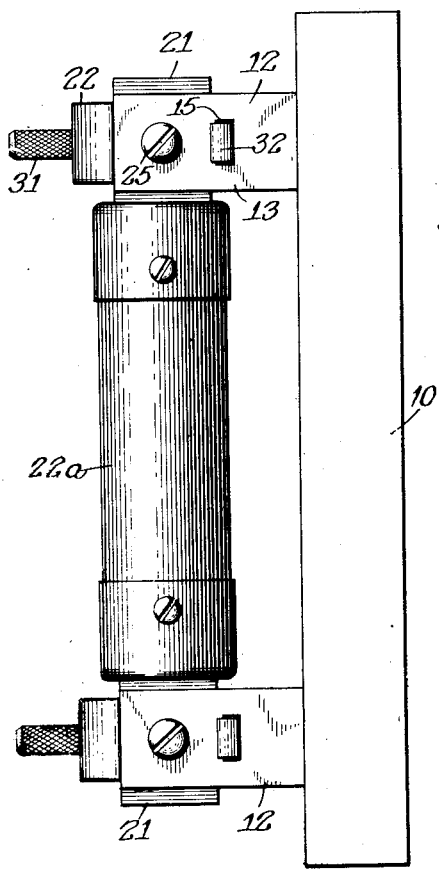
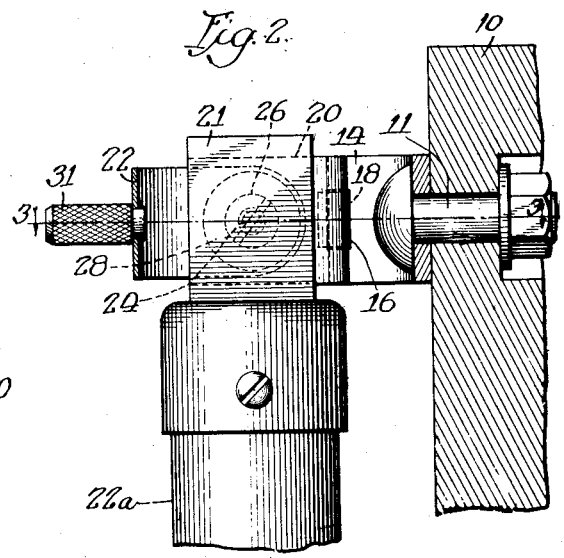
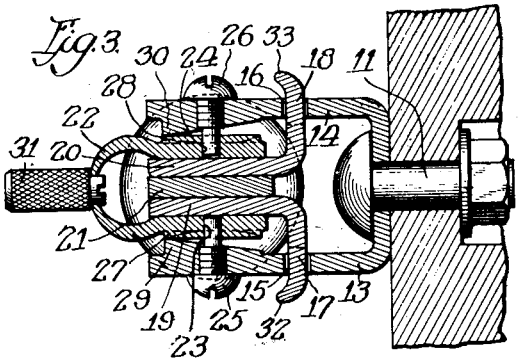
Witnesses:
Inventor.
Alfred L. Eustice.
By Wilkinson & Huxley
Attys

UNITED STATES PATENT OFFICE.

ALFRED L. EUSTICE, OF CHICAGO, ILLINOIS, ASSIGNOR TO ECONOMY FUSE & MANUFACTURING COMPANY, OF CHICAGO, ILLINOIS, A CORPORATION OF NEW YORK.

MEANS FOR ESTABLISHING ELECTRICAL CONNECTIONS.

1,350,444. Specification of Letters Patent. Patented Aug. 24, 1920.

Application filed July 20, 1917. Serial No. 181,719.

*To all whom it may concern:*

Be it known that I, ALFRED L. EUSTICE, a citizen of the United States, and resident of Chicago, in the county of Cook and State of Illinois, have invented certain new and useful Improvements in Means for Establishing Electrical Connections, of which the following is a specification.

This invention relates to electrical connections and more particularly to means for establishing and maintaining good electrical connections between electrical conductors.

One of the objects of the invention is to insure in a novel manner a good electrical connection between electrical conductors.

Another object is to provide means whereby there may be established and maintained good surface contact instead of line contact between electrical conductors adapted to meet the various requirements for successful commercial operation.

These and other objects are accomplished by providing in combination, a plurality of electrical conductors engageable with each other to make an electrical connection, and means to increase the intimacy of the connection.

The invention is illustrated on the accompanying sheet of drawings, in which—

Figure 1 is a side elevation of a fuse, the terminals of which are connected to novel fuse clips embodying my invention;

Fig. 2 is an enlarged fragmentary sectional view of the same, and,

Fig. 3 is a transverse sectional view of the same taken in the plane of line 3—3 of Fig. 2.

The various novel features will be apparent from the following description and drawings and will be particularly pointed out in the appended claims.

To illustrate my invention I have shown the same in connection with a fuse clip. However, it is to be understood that the invention is not limited in connection with such a use for it may be used wherever two conductors are mechanically as well as electrically connected.

Referring to the drawings, it will be noted that I have shown a suitable support 10 to which are secured by suitable fastening means 11, clip members 12 which are electrical conductors.

By referring particularly to Fig. 3, it will be noted that each of the clip members 12 is of U-shape and has in opposite legs 13 and 14, apertures 15 and 16, respectively, which loosely or slidably receive oppositely extending portions 17 and 18, respectively, of L-shaped members 19 and 20, which engage opposite sides of an electrical conductor 21. In this particular instance the electrical conductor 21 is a terminal of a fuse 22$^a$. However, it is understood that each of the conductors 21 may be an electrical conductor for any other purpose.

In the ordinary switches commonly known as knife blade switches, the movable switch member is pressed into engagement with a couple of spaced resilient members engaging opposite sides of the movable switch member. Under these conditions, in spite of the fact that the stationary switch members are resilient the electrical connections thus established are not always highly efficient primarily for the reason that the connection between the conductor is not sufficiently intimate, that is to say, there may be merely a line contact between the conductors instead of a surface contact.

One of the objects of the invention is to insure and maintain intimate contact between separable electrical conductors. This is done by insuring the establishment of a surface contact between the electrical conductors in question. To this end I have provided means for forcing the members 19 and 20 inwardly toward each other to engage more intimately opposite sides of the coöperating electrical conductor 21. This means, in this particular instance, takes the form of a U-shape conducting member 22, the legs of which are provided with openings 23 and 24 for the reception of pins or trunnion screws 25 and 26 respectively, which project inwardly through the legs 13 and 14 of the clips 12. The legs of the U-shaped member 22 are also provided on their outer sides with cam members 27 and 28 which respectively engage and coöperate with cam members 29 and 30, respectively, formed on the inner sides of the legs 13 and 14 of the clips 12.

By means of this arrangement it is apparent that when the U-shaped member 22 is rotated on the trunnions 25 and 26, by use of the handle 31 secured thereto, into the position shown in the figures of the drawings, that the cam members will coöperate in a manner to press the members 19 and 20 inwardly toward each other to more intimately engage the conductor 21 thereby insuring surface contact between the electrical conductors in question. The conductor 21 is inserted between the conductor members 19 and 20 when the U-shaped member is turned to a position 90 degrees from the position shown in the figures of the drawing whereupon the cams will be in such relative positions as to readily permit the insertion of the member 21 between the members 19 and 20. After the conductor 21 is inserted between the members 19 and 20, the U-shaped member 22 is rotated into its normal position as shown in the figures of the drawings, to cause surface contact between the conductors, as hereinabove set forth.

It will be noted that the U-shaped member, when in the position shown in the figures of the drawing, also forms a lock to prevent lateral withdrawal of the conductor 21 from between the members 19 and 20. The laterally extending portions 17 and 18 of the members 19 and 20 respectively, are provided with upturned tip portions 32 and 33 respectively to prevent removal of the portions 17 and 18 from the apertures 15 and 16 in the leg portions 13 and 14 of the clip 12.

By means of this clip connection it is apparent that good electrical surface contact between coöperating conductors may be established and maintained in a simple and efficient manner.

It is evident that there may be various modifications of the invention herein particularly shown and described, and it is my intention to cover all such modifications which do not involve a departure from the spirit and scope of the invention as set forth in the following claims.

I claim:

1. A clip for electrical connections including a support, conducting members mounted on said support, and means operable between said support and said conducting members for moving the conducting members toward each other.

2. A clip for electrical connections including in combination, a support having cam means, a conducting member, and means operable between said cam means and conducting member for moving the latter.

3. A clip for electrical connections including in combination, spaced members having openings therein, conducting members having portions extending through said openings for support, and means for moving said conducting members toward each other.

4. A clip for electrical connections including in combination, spaced members having cams formed thereon, conducting members, trunnions carried by said spaced members, and cam means mounted on said trunnions and coöperating with the cams on said spaced members for giving movement to said conducting members.

5. A clip for electrical connections including in combination, spaced members with openings and having cam portions, trunnions carried by said spaced members, conducting members having portions extending through said openings, cam means mounted on said trunnions and coöperating with said cam portions for giving movement to said conducting members.

6. A clip having spaced members, movable jaws supported thereby, trunnions supported by said spaced members, and means carried by said trunnions for moving said jaws relatively with respect to each other.

7. A clip for electrical connections including in combination, spaced members having cams on the free ends thereof, trunnions supported thereby, connecting members loosely mounted in said spaced members, and means carried by said trunnions and coöperating with said cams for moving said conducting members toward each other.

8. A clip for electrical connections in combination, a conductor, a U-shaped clip having cam surfaces on the free ends thereof, conductors mounted in said clip and having electrical connection therewith, and means in said clip engaging the cam surfaces thereof for establishing electrical contact between said conductor and conductors under certain circumstances.

In witness whereof I hereunto subscribe my name this 18th day of July, A. D. 1917.

ALFRED L. EUSTICE.